United States Patent [19]

Ben-Amoz

[11] Patent Number: 4,923,371
[45] Date of Patent: May 8, 1990

[54] WALL HAVING COOLING PASSAGE

[75] Inventor: Meir Ben-Amoz, Lynn, Mass.

[73] Assignee: General Electric Company, Lynn, Mass.

[21] Appl. No.: 175,878

[22] Filed: Apr. 1, 1988

[51] Int. Cl.$^5$ .............................................. F01D 5/18
[52] U.S. Cl. .............................. 416/97 R; 416/96 R; 415/115
[58] Field of Search ........................ 416/96 R, 97 R; 415/115, 116; 60/39.83

[56] References Cited

U.S. PATENT DOCUMENTS

| 3,420,058 | 1/1969 | Howald et al. | 60/757 |
| 3,527,543 | 9/1970 | Howald | 416/97 R |
| 3,737,152 | 6/1973 | Wilson | 60/757 |
| 3,801,218 | 4/1974 | Moore | 416/97 |
| 3,819,295 | 6/1974 | Hauser et al. | 416/97 R |
| 4,242,871 | 1/1981 | Breton | 60/757 |
| 4,529,358 | 7/1985 | Papell | 415/115 |
| 4,653,983 | 3/1987 | Vehr | 416/97 R |
| 4,664,597 | 5/1987 | Auxier et al. | 416/97 R |
| 4,669,957 | 6/1987 | Phillips et al. | 416/97 R |
| 4,684,323 | 8/1987 | Field | 416/97 R |

FOREIGN PATENT DOCUMENTS

| 1451793 | 7/1966 | France | 416/97 R |
| 51202 | 3/1983 | Japan | 416/97 R |

OTHER PUBLICATIONS

F. B. Seely et al., "Advanced Mechanics of Materials", 1932, pp. 385-389.

Primary Examiner—Robert E. Garrett
Assistant Examiner—John T. Kwon
Attorney, Agent, or Firm—Francis L. Conte; Derek P. Lawrence

[57] ABSTRACT

The invention comprises a wall having first and second spaced surfaces, and a first plane disposed therebetween which includes first and second coplanar and orthogonal axes. A passage extends between the first and second surfaces and includes a portion having longitudinal axis disposed at an acute angle to the first plane, the first section being disposed perpendicularly to the longitudinal axis and the second section being disposed parallel to the first plane. The passage first section is generally elliptical and the passage second section is generally circular.

13 Claims, 3 Drawing Sheets

WALL HAVING COOLING PASSAGE

The Government has rights in this invention pursuant to Contract Number N00019-85-C-0459 awarded by the Department of the Navy.

BACKGROUND OF THE INVENTION

This invention relates generally to cooling passages in a wall, and, more specifically, to cooling passages in gas turbine engines such as, for example, in combustor liners and turbine blades and vanes thereof.

Gas turbine engines typically include structures such as combustor liners and stationary and rotating turbine blades and vanes which are subject to relatively hot combustion gases. The structures are typically provided with cooling passages for protection from the hot combustion gases. It is conventionally known that any passage or hole contained in a wall structure subject to stress results in a stress concentration about such hole which must be considered in determining the useful life of that structure.

Cooling passages typically utilized in gas turbine engines are generally circular in section. However, when a passage having a circular section is disposed at an angle in a wall, the section of that passage in a plane parallel to the plane of the wall is elliptical. Elliptical holes have major and minor axes, and, depending upon the orientation of principal stress with respect to the major and minor axes, stress concentrations about the hole may be generated which are either less than or greater than those associated with a circular hole. For example, in a wall subject to a principal, tensile stress in a single axis, the conventional stress concentration about a circular hole is equal to 3 and the conventional stress concentration about an elliptical hole is equal to $1+2a/b$ or $1+2b/a$, where a and b represent the major and minor semi-axes, and are oriented either perpendicular or parallel to the principal stress, respectively.

Accordingly, the use in a wall of an inclined cooling passage having a circular section will generate an elliptical section, which, depending on its orientation with respect to the principal stress in the wall, can result in a stress concentration either less than or greater than that of a circular hole. A stress concentration greater than that of a circular hole will lead to an undesirable shortening of the life of the wall.

Accordingly, it is an object of the present invention to provide a new and improved wall having an inclined cooling passage therein.

Another object of the present invention is to provide a new and improved wall having a cooling passage of a predetermined section predeterminedly oriented with respect to principal stress in the wall for obtaining a reduced stress concentration.

Another object of the present invention is to provide a new and improved wall having an inclined cooling passage for improving useful life of the wall.

SUMMARY OF THE INVENTION

The invention comprises a wall having first and second spaced surfaces, and a first plane disposed therebetween which includes first and second coplanar and orthogonal axes. A passage extends between the first and second surfaces and includes a portion having a longitudinal axis disposed at an acute angle to the first plane, a first section disposed perpendicularly to the longitudinal axis and a second section disposed parallel to the first plane. The passage first section is generally elliptical and the passage second section is generally circular.

BRIEF DESCRIPTION OF THE DRAWINGS

The invention, in accordance with preferred and exemplary embodiments thereof, together with additional advantages will be described in conjunction with the drawing in which.

DETAILED DESCRIPTION

Figure 1:
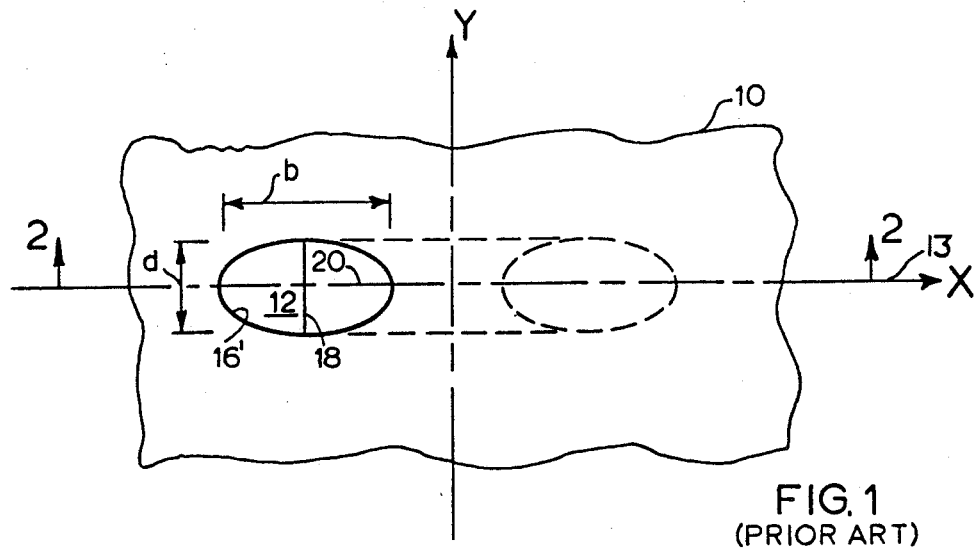
FIG. 1 represents a sectional view of a prior art wall including a cooling passage having a circular section with respect to a longitudinal axis thereof.
Figure 2:
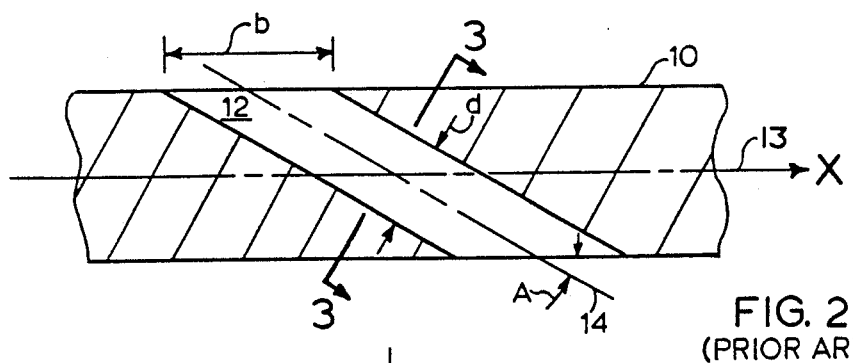
FIG. 2 represents a sectional view of the cooling passage illustrated in FIG. 1 taken along line 2—2.
Figure 3:
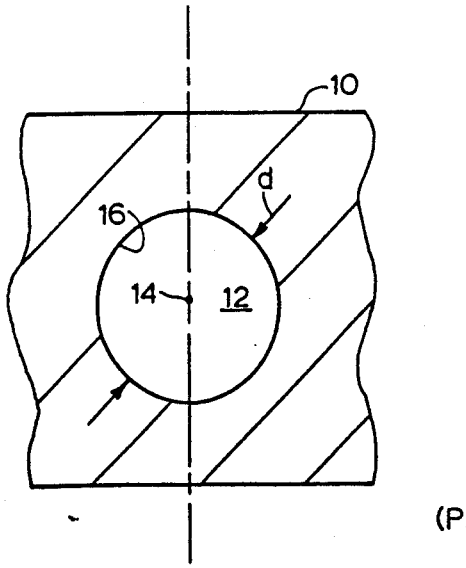
FIG. 3 represents a sectional view of the cooling passage illustrated in FIG. 2 taken along line 3—3.

Illustrated in FIGS. 1-3 is a prior art wall 10 including a passage 12 inclined at an acute angle A relative to a longitudinal axis X (indicated by numeral 13) of the wall 10. The passage 12 includes a centerline longitudinal axis 14 and is cylindrical with a plurality of uniform circular sections 16 thereof of diameter d disposed perpendicularly to the longitudinal axis 14.

Inasmuch as the passage 12 is inclined at an angle A with respect to the longitudinal axis X, the projection, or shapes of the sections 16 parallel to a plane including the longitudinal axis X and a transverse axis Y disposed perpendicularly thereto, is elliptical as illustrated by section 16' in FIG. 1. The section 16' has a minor axis 18 of length d and a major axis 20 of length b, where b is equal to $d/\sin(A)$.

Accordingly, although the passage 12 has sections 16 which are circular in shape with respect to the longitudinal axis 14 of the passage 12, the sections 16' of the passage 12 parallel to the X axis are elliptical in shape with the major axis being oriented parallel to the X axis and the minor axis being oriented parallel to the Y axis as shown in FIG. 1. In a structural application where the wall 10 is subjected to a primary stress in the Y axis, a stress concentration will occur at the points of intersection of the section 16' and the major axis 20. The stress concentration may be represented by the factor K1, which can be conventionally determined to be equal to $1+2b/d$ or $1+2/\sin(A)$. In this situation, the stress concentration factor K1 is larger than the stress concentration factor of 3, which would exist for a simple circular section, and indicates that the local stress at such points is more than 3 times greater than the primary stress.

Figure 4:
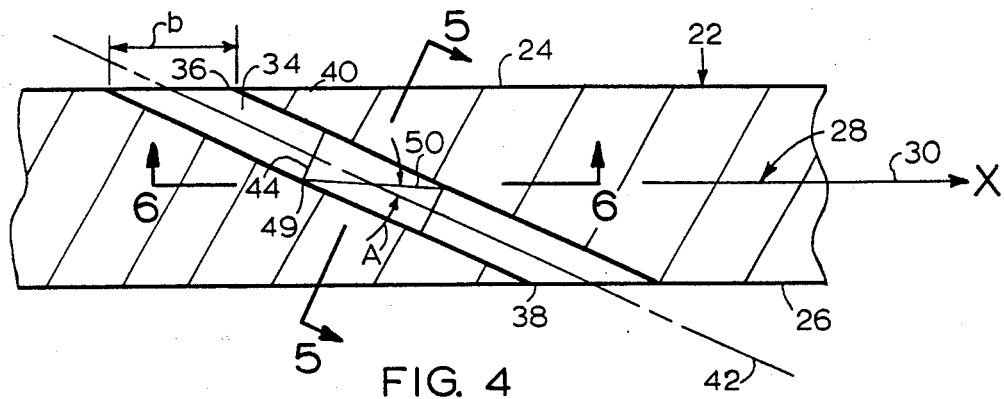
FIG. 4 represents a sectional view of a wall including a cooling passage in accordance with an exemplary embodiment of the present invention.
Figure 5:
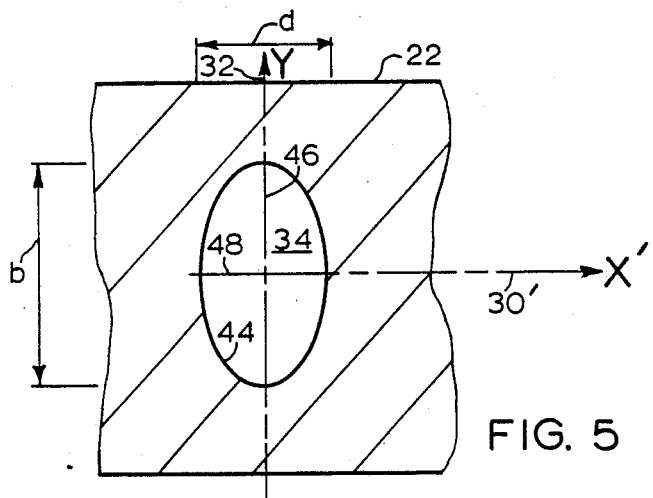
FIG. 5 is a sectional view of the wall illustrated in FIG. 4 taken along line 5—5, perpendicular to the longitudinal axis of the cooling passage.
Figure 6:
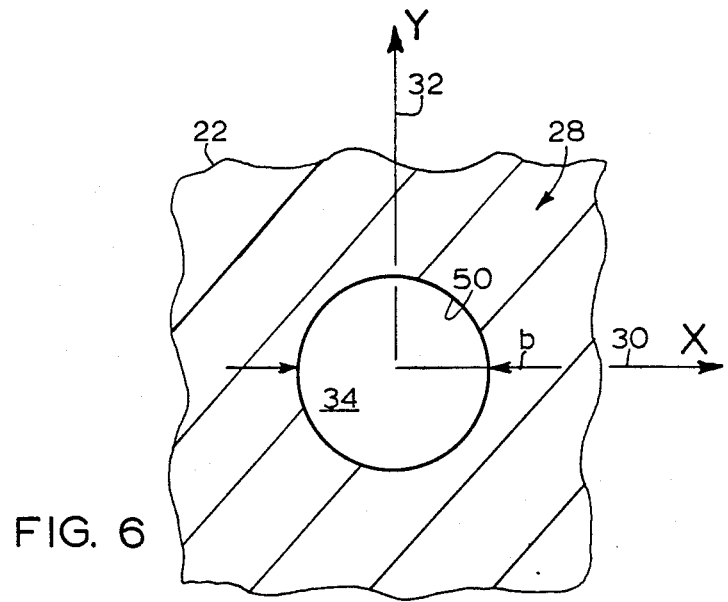
FIG. 6 is a sectional view of the wall illustrated in FIG. 4 taken along line 6—6, parallel to the surfaces of the wall.

Illustrated in FIGS. 4–6 is a preferred and exemplary embodiment of the present invention including a wall 22. The wall 22 includes a first surface 24 and a second surface 26 spaced from the first surface 24, and, in the embodiment illustrated, is parallel thereto.

The wall 22 includes a first plane 28 of principal stress disposed between the first and second surfaces 24 and 26, which is defined by and includes a first, or X, axis 30 and a second, or Y, axis 32 disposed coplanar and orthogonally or perpendicularly thereto. The wall 22 includes an inclined passage 34, which in the embodiment illustrated is substantially straight, which extends from an inlet 36 in the first surface 24 to an outlet 38 in the second surface 26.

Passage 34 includes a portion 40 having a longitudinal axis 42 which, in the embodiment illustrated, is the same as the longitudinal axis of the entire passage 34. The longitudinal axis 42 is disposed at an acute angle A to the first plane 28 and the first axis 30 therein. Passage portion 40 also includes a first section 44 disposed perpendicularly to longitudinal axis 42. Although one first section 44 is being described, the entire passage 34, except for the inlet and outlet portions, is comprised of a plurality of identical first sections 44 as illustrated. However, the passage 34 need not necessarily be straight or entirely symmetrical, and, therefore, the first sections 44 may alternatively have different shapes as required for particular applications.

The first section 44 is more particularly illustrated in FIG. 5 and includes a major axis 46 of length b and a minor axis 48 disposed perpendicularly thereto and having a length d. In the embodiment illustrated, the entire passage portion 40 has a plurality of cross sections which are identical to the first section 44.

The passage portion 40 also includes a second section 50, which is disposed parallel to the first plane 28.

In accordance with the present invention, the cross-sectional shape of the first sections 44 of the passage 34 is predeterminedly selected for obtaining a reduced stress concentration in the plane of principal stress 28 when the passage 34 is inclined at acute angle A. More specifically, the cross-sectional shape of the passage 34 as defined perpendicularly to the longitudinal axis 42 thereof is represented by the first section 44 and has a predetermined, generally elliptical shape. The elliptical shape of the first section 44 is predeterminedly selected to result in the second section 50, disposed parallel to the plane of principal stress 28, having a circular cross section.

In other words, the second section 50 is a projection of the first section 44 in the plane of principal stress 28, and the first and second sections 44 and 50 are connected to each other at intersection point 49.

As illustrated in prior art FIGS. 1–3, the inclined passage 12 having circular cross sections 16 results in the sections 16' parallel to the X axis having an elliptical shape. In contrast, and in accordance with one embodiment of the present invention, the passage 34 illustrated in FIGS. 4–6 is elliptical in sections perpendicular to the longitudinal axis 42 and circular in sections parallel to the plane of principal stress 28 and the X axis 30.

In a wall wherein the principal stress is in the Y axis direction, elliptical section 16', illustrated in FIG. 1, results in a conventional stress concentration of $1 + 2/\sin(A)$. In contrast, passage 34, in accordance with the embodiment illustrated in FIGS. 4–6, results in the circular section 50 having the conventional stress concentration value of 3. The ratio of the stress concentration factor for the second section 50 of the passage 34 relative to the stress concentration of the section 16' of the prior art passage 12 is represented by $3/(1 + 2/\sin(A))$, which will have a value of 0.438 for an acute angle A of 20° and a value of 0.523 for an acute angle A of 25°. Accordingly, by selecting the elliptical shape of the passage 34 in accordance with the present invention, the stress concentration created by the passage 34 can be reduced about half for these representative angles described. Such a reduction can substantially improve the useful life of the wall 22.

More specifically, in order to obtain circular second sections 50 in the passage 34 inclined at an acute angle A, the first sections 44 must be elliptical, having a major axis 46 of length b and a minor axis 48 of length d, where d is equal to b sin(A).

In an example wherein the second axis 32 as illustrated in FIG. 6 represents the direction of principal stress, it is preferred that the passage longitudinal axis 42 be disposed at an acute angle A relative to the first axis 30 as illustrated in FIG. 4. The major axis 46 of the elliptical first section 44 should be aligned parallel to the second axis 32 and the minor axis 48 should be aligned parallel to the first axis 30 in order to obtain the circular second section 50. Note that in the plane illustrated in FIG. 5, the minor axis 48 is coincident with an X', or 30', axis which is rotated from the first axis 30 by 90-A degrees. However, the minor axis 48 is still parallel to the X axis.

Although the wall 22 described above with respect to FIGS. 4–6 includes generally parallel first and second surfaces 24 and a substantially straight passage 34, the invention may be utilized in various structures having an inclined passage and directions of principal stress. A fundamental feature of the invention is the use of a passage having a generally elliptical cross section in a plane perpendicular to a longitudinal, centerline axis of the passage predeterminedly selected so that in a plane of principal stress disposed at an acute angle from the longitudinal axis of the passage, a generally circular cross-sectional shape results for obtaining a reduced stress concentration factor.

Figure 7:
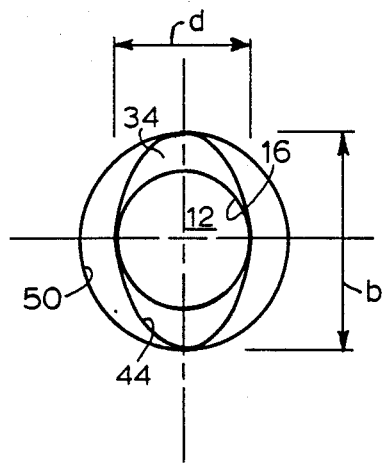
FIG. 7 is a schematic representation superimposing three circular and elliptical sections of cooling passages of the prior art wall illustrated in FIGS. 1-3 and the embodiment of the invention illustrated in FIGS. 4-6.

Illustrated in FIG. 7 are superimposed passage sections illustrating additional potential advantages of the present invention. More specifically, FIGS. 1–3 illustrate a passage 12 having a circular cross section 16 of diameter d. Section 16 is illustrated as the centermost circle in FIG. 7. The invention as illustrated in FIG. 4 utilizes a passage 34 having the elliptical first section 44 including the minor axis 48 of dimension d. The first section 44 is the middle section illustrated in FIG. 7. If the passage 34 were directly substituted for the passage 12 in a structure, FIG. 7 illustrates that passage 34 would have an increased cross-sectional flow area and increased surface area which, it is believed, can increase the cooling effectiveness of the passage 34 over the passage 12.

Furthermore, the use of the passage 34 will result in a circular second section 50 having a diameter b, which is shown as the outermost circle in FIG. 7. The outlet 38 of the passage 34, in the embodiment illustrated in FIG. 4, would have an identical circular shape as shown for the second section 50. FIG. 7 clearly indicates that the passage 34 having the elliptical first section 44 will result in a discharge outlet 50 of a circular shape substantially larger than that of the first section 44.

Figure 8:
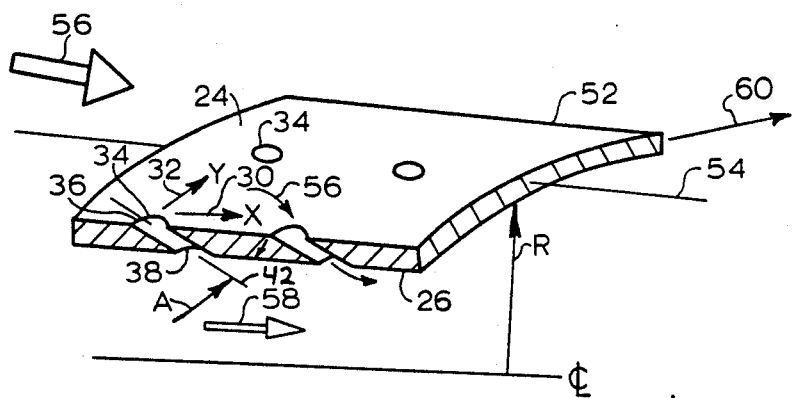
FIG. 8 is a perspective view of a fragmentary portion of a combustor liner of a gas turbine engine in accordance with one embodiment of the present invention.

Illustrated in FIG. 8 is a portion 52 of a gas turbine engine combustor liner. The liner portion 52 is arcuate and has a radius of curvature R with respect to a longitudinal axial centerline axis of the engine. In this exemplary embodiment, the liner portion 52 includes a plurality of the passages 34 each inclined at an angle A with respect to a longitudinal axis 54 of the liner portion 52. The wall first surface 24 is the outer surface of the liner portion 52, over which a cooling fluid 56, such as air, is flowable. The wall second surface 26 is the inner surface of the liner portion 52, over which hot combustion gases 58 are flowable. The first axis 30 is aligned parallel to the longitudinal axis 54 and the second axis 32 is aligned parallel to a tangential axis 60 of the gas turbine engine at the passage 34, which represents the direction of hoop stress in the liner portion 52.

The passage 34 in the liner portion 52 also includes the inlet 36 in the outer surface 24 for receiving cooling fluid 56, and further includes the outlet 58 in the inner surface 26 for discharging the cooling fluid 56 from the passage 34. The inlet 36 is disposed forward of the outlet 58 in the liner portion 52 so that the cooling fluid 56 continues in a generally downstream direction with respect to liner portion 52, with a relatively minor change of direction through the passage 34. The details of the passage 34 in FIGS. 4-6 are similarly applicable to the passage 34 in the liner portion 52 illustrated in FIG. 8.

Figure 9:
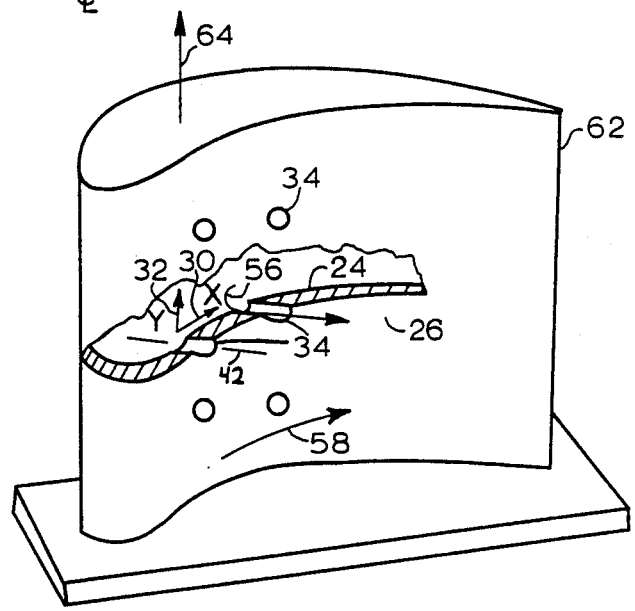
FIG. 9 is a perspective view of a gas turbine engine blade including a wall in accordance with one embodiment of the present invention.

Illustrated in FIG. 9 is a gas turbine engine blade 62, which may be either a rotating blade or a stationary vane, being conventionally hollow and provided with the cooling fluid 56. The wall 22 of FIG. 4 comprises a portion of the blade 62 and in the embodiment illustrated comprises a portion of the convex side of the blade 62. The first surface 24 is the inner surface of the blade 62, over which the cooling fluid 56 is flowable through the hollow interior of the blade 62. The second surface 26 is the outer surface of the blade 62, over which the hot combustion gases 58 are flowable. The first axis 30 is aligned generally parallel to the first and second surfaces 24 and 26 at the passage 34, and the second axis 32 is aligned generally parallel to a radial axis 64 of the blade 62 and represents the direction of centrifugal stress in the blade 62. The passage 34 in the blade 62 is disposed identically in accordance with FIGS. 4-6.

In the embodiment illustrated in FIG. 8, the use of conventional circular passages through the liner portion 52 would have resulted in elliptical sections parallel to the longitudinal axis 54 resulting in maximum stress concentration. However, the use of the elliptical passages 34, in accordance with the present invention, results in circular sections parallel to the longitudinal axis 54, resulting in a decrease in stress concentration to that associated with a simple circle.

In the embodiment illustrated in FIG. 9, circular cooling passages which would be conventionally used would similarly result in elliptical sections parallel to the longitudinal axis 30, resulting in maximum stress concentration due to the centrifugal stresses in the radial direction. However, the use of the elliptical passages 34 in the blade 62 results in circular sections in the plane parallel to the X axis, resulting in a decrease in stress concentration over that which would result from the use of circular cooling passages.

Accordingly, the use of the predeterminedly shaped and oriented cooling passages 34 in accordance with exemplary embodiments of the invention results in a structure having decreased stress concentrations over that which would otherwise result from using circular passages for improving the useful life of the structure.

The elliptical passages 34 of the present invention may be formed by using any appropriate conventional manufacturing means including, for example, laser drilling, electrical discharge machining or electrochemical machining.

Having thus described the preferred embodiments of the present invention, other embodiments will be apparent to those skilled in the art from the teachings herein.

Accordingly, what is desired to be secured by letters patent of the United States is:

What is claimed:

1. A wall comprising:
    a first surface;
    a second surface spaced from said first surface;
    a first plane disposed between said first and second surfaces and including first and second coplanar, orthogonal axes; and
    a passage extending between said first and second surfaces and including a portion having:
        a longitudinal axis disposed at an acute angle to said first plane;
        a first section disposed perpendicularly to said longitudinal axis;
        a second section disposed parallel to said first plane; and
        said first section being generally elliptical and said second section being generally circular.

2. A wall according to claim 1 wherein said second axis represents a direction of principal stress, said passage portion longitudinal axis is disposed at an acute angle to said first axis; said passage portion first section is elliptical and has a major axis aligned parallel to said first axis, and a minor axis aligned parallel to said second axis.

3. A wall according to claim 2 wherein said acute angle is represented by A, said passage portion second section is circular having a diameter b, said passage portion first section major axis is equal to b, and said passage portion first section minor axis has a value d, which is equal to b sin(A).

4. A wall according to claim 2 wherein said passage includes an inlet in said first surface and an outlet in said second surface, said passage is substantially straight from said inlet to said outlet, and said passage includes a plurality of said passage first and second sections from said inlet to said outlet.

5. A wall according to claim 2 wherein said wall comprises a portion of a combustor liner of a gas turbine engine; said first surface is an outer surface of said liner over which a cooling fluid is flowable; said second surface is an inner surface of said liner over which hot combustion gases are flowable; said first axis is aligned parallel to a longitudinal axis of said liner, and second axis is aligned parallel to a tangential axis of said gas turbine engine and represents direction of hoop stress in said liner.

6. A wall according to claim 5 wherein said passage includes:
    an inlet in said outer surface for receiving said cooling fluid;
    an outlet in said inner surface for discharging said cooling fluid;
    said inlet being disposed forward of said outlet in said liner;

and wherein said acute angle is represented by A, said passage portion second section is circular having a diameter b, said passage portion first section major axis is equal to b, and said passage portion first section minor axis has a value d, which is equal to b sin(A).

7. A wall according to claim 6 wherein said passage is substantially straight from said inlet to said outlet and said passage includes a plurality of said passage first and second sections from said inlet to said outlet.

8. A wall according to claim 2 wherein:
said wall comprises a portion of a gas turbine engine blade;
said first surface is an inner surface of said blade over which a cooling fluid is flowable;
said second surface is an outer surface of said blade over which hot combustion gases are flowable;
said first axis is aligned generally parallel to said second surface; and
said second axis is aligned generally parallel to a radial axis of said gas turbine engine and represents direction of centrifugal stress in said blade.

9. A wall according to claim 8 wherein said passage includes:
an inlet in said inner surface for receiving said cooling fluid;
an outlet in said outer surface for discharging said cooling fluid;
said inlet being disposed forward of said outlet in said blade;
said acute angle is represented by A;
said passage portion second section is circular having a diameter b;
said passage portion first section major axis is equal to b; and
said passage portion first section minor axis has a value d, which is equal to b sin(A).

10. A wall according to claim 8 wherein said passage is substantially straight from said inlet to said outlet and said passage includes a plurality of said passage first and second sections from said inlet to said outlet.

11. A wall according to claim 2 wherein said passage second section is a projection of said passage first section and is connected thereto.

12. A wall comprising an inclined passage having a first section and a second section wherein said first section is generally elliptical and is disposed substantially perpendicular to a longitudinal axis of said passage, and said second section is a projection of said first section and is generally circular.

13. A wall according to claim 12 further including a plane of principal stress and said second section is disposed parallel thereto.

* * * * *